United States Patent [19]

Shafrir et al.

[11] 4,333,519

[45] Jun. 8, 1982

[54] CONTROLLER FOR AIR CONDITIONING UNITS, HEATING UNITS AND THE LIKE

[76] Inventors: Doron Shafrir, 4 Ross Ave., Spring Valley, N.Y. 10977; Jeffrey Lamb, 172-41 Highland Ave., Jamaica Estates, N.Y. 11432

[21] Appl. No.: 148,059

[22] Filed: May 8, 1980

[51] Int. Cl.³ ................... F25B 29/00; F23N 5/20
[52] U.S. Cl. .................................. 165/12; 165/27; 236/46 F
[58] Field of Search ............... 165/12, 27; 236/46 R, 236/1 C, 46 F; 318/596; 62/228.4, 208

[56] References Cited

U.S. PATENT DOCUMENTS

| | | | |
|---|---|---|---|
| 3,443,121 | 5/1969 | Weisbrod | 236/46 F |
| 3,541,429 | 11/1970 | Martin | 219/492 X |
| 3,599,864 | 8/1971 | Liddle | 219/492 X |
| 3,768,545 | 10/1973 | Wills | 165/27 |

Primary Examiner—William E. Wayner
Attorney, Agent, or Firm—Hubbell, Cohen, Stiefel & Gross

[57] ABSTRACT

A controller (10) for air conditioning units, heating units, and the like is disclosed. The controller (10) regulates the activation and deactivation of an energy consuming component of the unit, such as a compressor (12) or heating coil (14). The controller (10) includes a switch means (42, 66) operatively connected to the component and its energy source, the switch means (42, 66) being operable in a first mode wherein it interrupts the connection between the energy source and the component, a second mode wherein the connection between the energy source and the component is uninterrupted by the switch means (42, 66). The controller also includes control means (20, 54) operatively connected to the switch means (42, 66) for (a) operating the switch means (42, 66) in one mode when the space temperature exceeds a first predetermined temperature, (b) operating the switch means (42, 66) in the other mode when the space temperature is less than a second predetermined temperature and (c) cycling the switch means (42, 66) between its first and second modes according to a predetermined duty cycle when the space temperature is between the first and second predetermined temperatures.

36 Claims, 5 Drawing Figures

CONTROLLER FOR AIR CONDITIONING UNITS, HEATING UNITS AND THE LIKE

TECHNICAL FIELD

This invention pertains to controllers for regulating the operation of air conditioning units, heating units and the like and more particularly to controllers for regulating such units for the purpose of reducing the energy consumption thereof.

BACKGROUND ART

Use of multiple incremental (through the wall) or window-mounted air conditioning units in hotels, motels and offices is quite common. Typically, such units are regulated by a conventional thermostatic control which activates the compressor whenever the room temperature exceeds the desired room temperature as selected by the occupant and dialed into the thermostat.

Such units are extremely energy inefficient for several reasons. For one, the compressor remains activated as long as the room temperature exceeds the thermostat setting, regardless of how cold the room actually is. Also, as long as the room temperature is higher than the thermostat set temperature, the compressor is continuously activated irrespective of how close the room temperature and thermostat set temperatures are. Since the compressor is by far the largest energy consuming component of such units, these aspects of operation, which result in unnecessary use of the compressor, lead to wasted energy. To reduce some of this waste, it has been suggested to continuously cycle the compressor according to a fixed duty cycle. When this is done, a separate circuit for preventing the compressor from short cycling is generally included, as such short cycling can result in compressor motor failure. While such systems represent an improvement over conventional thermostatically regulated air conditioning units, they still have a number of drawbacks. For one, they do not compensate for the situation where the thermostat setting calls for an extremely low room temperature. This is a common situation in motels, hotels and offices where occupants set the thermostat extremely low upon leaving the room so that the room will be cool when they return. Such systems also fail to compensate for situations where the room tempreature is quite high and it is desirable to have the compressor running continuously rather than cycling.

DISCLOSURE OF INVENTION

The controller of the present invention provides energy savings over prior art controllers by operating the regulated unit in one of three modes depending on the room temperature. More specifically, the controller of the invention establishes a comfort zone defined by upper and lower temperatures, and operates the regulated unit in one mode when the room temperature is below the lower limit of the comfort zone, a second mode when the room temperature is in the comfort zone, and a third mode when the room temperature is above the upper limit of the comfort zone.

The comfort zone is defined by first and second temperature sensitive devices, which may be temperature sensitive switches. If the regulated unit is, for example, an air conditioner, the first temperature sensitive device would provide an output signal when the room temperature exceeds the upper limit of the comfort zone, e.g. 78° F., and the second temperature sensitive device would provide an output signal when the room temperature is below the lower limit of the comfort zone, e.g. 72° F. The output signals from the first and second temperature sensitive switches are applied to two inputs of a logic control circuit, which also receives an input signal from a cycling circuit. When activated, the cycling circuit generates an output signal having a predetermined duty cycle. The output signal from the logic control circuit is operatively connected to switch means, which may be a relay, which, in turn, is operatively connected to the compressor and its power source. In response to an output signal from the logic control circuit, the switch means interrupts the connection between the compressor and its power source thereby deactivating the compressor.

In operation in an air conditioner, when the first temperature sensitive device generates an output signal indicating that the room temperature is below the lower limit of the comfort zone, the logic control circuit responds by generating a signal which operates the switch means to interrupt the connection between the compressor and its power source. When the second temperature sensitive device generates a signal indicating that the room temperature is above the upper limit of the comfort zone, the logic control circuit operates the switch means such that it does not interrupt the connection between the compressor and its power source. When neither of the first and second temperature sensitive devices generates an output signal, thereby indicating that the room temperature is in the comfort zone, the logic control circuit responds to the input from the cycling circuit whereupon it cycles the switch means between its interrupted and uninterrupted modes.

It will therefore be apparent that the controller of the invention reduces energy consumption by deactivating the compressor whenever the room temperature is below the lower limit of the comfort zone, and by cycling the compressor whenever the room temperature is within the limits of the comfort zone. When the room temperature gets too hot, i.e. exceeds the upper limit of the comfort zone, the controller operates the compressor in a continuous mode until the temperature again drops into the comfort zone, whereupon the compressor is again cycled. Thus, the controller operates the compressor to maintain the room temperature within the comfort zone whenever possible. Where the air conditioner employs a fan to blow cool air into the room, the controller preferably will not deactivate the fan during cycling. In this way, it will not be apparent that the regulated unit is being controlled by other than the thermostat.

Preferably, the controller is used in combination with the conventional thermostatic control typical of most air conditioner units. In such case, the switch means is preferably connected in series with the thermostatic control, the compressor, and its power source. Therefore, if either the switch means or the thermostatic control is in an open circuit condition, the connection between the compressor and its power source is interrupted thereby deactivating the compressor. This is desirable as it permits the room occupant to deactivate the compressor when the controller would otherwise call for activation. For example, if the room temperature is within the comfort zone, the controller would normally cycle the compressor. However, if the temperature selected by the occupant is higher than the room temperature, the thermostatic control will nevertheless deactivate the compressor. When the controller is adapted for regulating an air conditioning unit, it will preferably include means for preventing the compressor from short cycling, as this could result in compressor motor damage.

The controller of the invention may also be used to regulate the energy consumption of a heating system in which case the controller regulates the activation and deactivation of the heating element, which may be a heating coil. When regulating a heating system, the controller deactivates the heating element when the room temperature exceeds the upper limit of the comfort zone, activates the heating element when the room temperature falls below the lower limit of the comfort zone, and cycles the heating element when the room temperature is within the comfort zone. Again, the conventional thermostatic device in the regulated heating system is preferably used to override the controller to deactivate the heating element when the temperature selected by the occupant is less than the room temperature.

In a preferred embodiment, the controller is designed to regulate both a cooling system and a heating system, as such systems are often combined in incremental units of the type found in hotels, motels and offices.

In a modification particularly suited for use in hotels and motels, an occupant detection circuit is provided. For example, where the regulated unit is an air conditioner, the occupant detection circuit operates the switch means to deactivate the compressor whenever the room is empty. Likewise, in the case of a heating system, the occupant detection circuit operates the switch means to deactivate the heating element when the room is empty. In one embodiment, the occupant detection circuit comprises a switch operable by the room key, in which case the switch may be mounted in a suitable receptacle having an opening for the key. When the occupant is in the room and the key inserted into the receptacle for closing the switch, the controller would function in the usual fashion. However, upon removal of the key, the switch opens, whereupon the compressor or other regulated component is deactivated. If desired, means may be provided for overriding the occupant detection switch to prevent the temperature in the room from becoming too extreme. For example, where the controller is used to regulate an air conditioner, an additional temperature sensitive switch responsive to a temperature above the upper limit of the comfort zone may be connected across the occupant detection switch in which event the additional temperature sensitive switch will short circuit the occupant detection switch when the room becomes too hot. This will enable the controller to activate the compressor thereby driving down the room temperature.

These as well as further features and advantages of the controller according to the present invention will become more fully apparent from the following detailed description and annexed drawings of the preferred embodiments thereof.

BEST MODE FOR CARRYING OUT THE INVENTION

Figure 1:
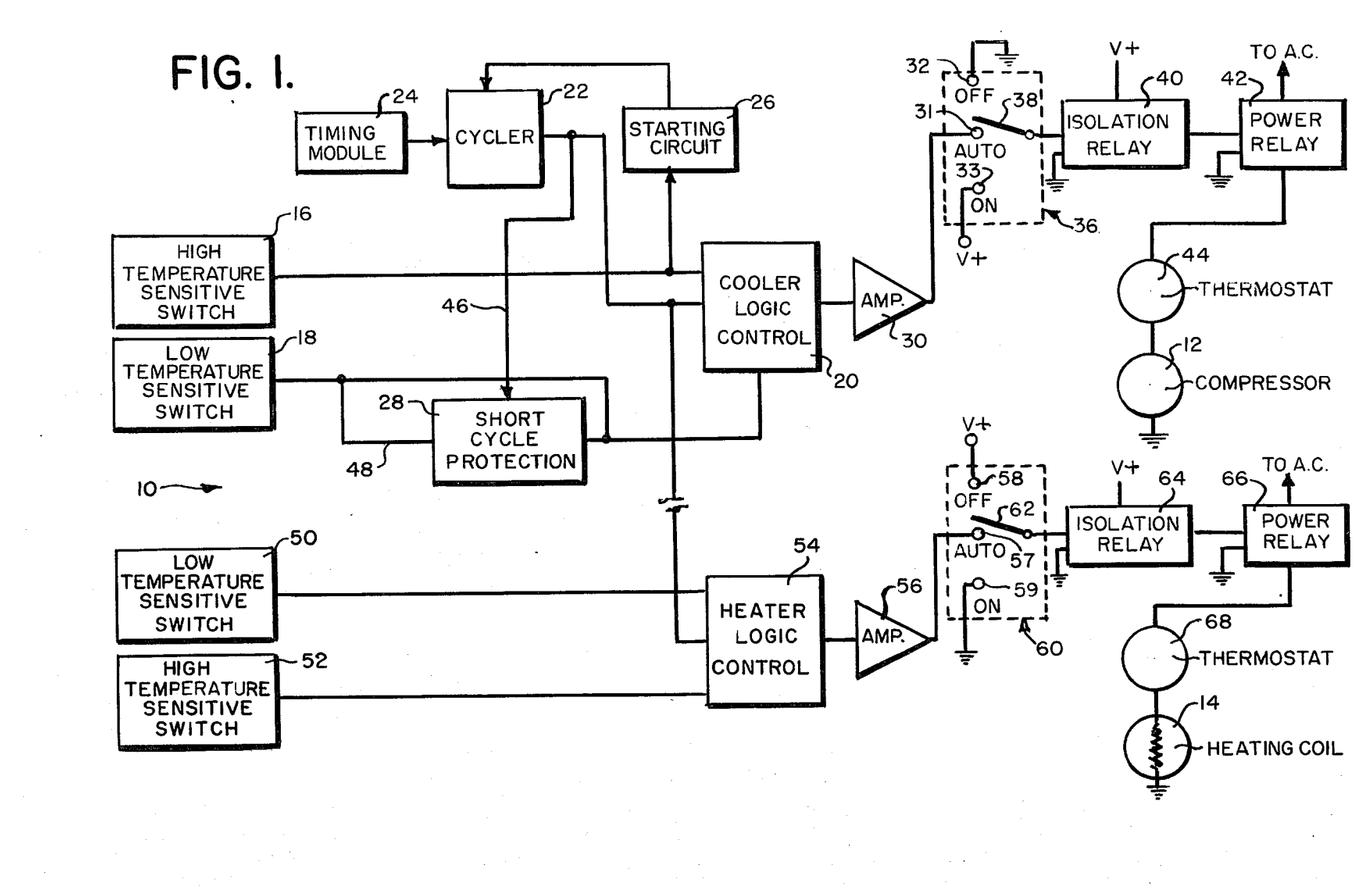
FIG. 1 is a diagrammatic illustration of the preferred controller of the present invention.

Referring now to the drawings, the preferred controller in accordance with the present invention is diagrammatically illustrated in FIG. 1 and generally designated by the reference numeral 10. The controller 10 is particularly designed for regulating incremental or window units such as those found in hotels and motels, and thus preferably includes the capacity for regulating both the cooling and heating cycles of such units. In the cooling mode, the controller 10 regulates the compressor 12 while in the heating mode it regulates the heating element 14, which may be a heating coil.

The cooling mode of the controller 10 will now be described. In the following description, it will be assumed that analog circuit components are employed. However, once this description is known, it will be apparent to those skilled in the art that digital circuit components or even a microprocessor may be substituted.

The cooling section of the controller 10 includes a pair of temperature sensitive switches 16 and 18. As will be apparent hereinafter, the switches 16 and 18 define, respectively, the upper and lower temperature limits of the comfort zone. The comfort zone represents the preferred temperature range for the room when occupied. For example, the switch 16 may be set to generate a high output signal when the room temperature is 78° F. or higher, and a low output signal otherwise. The switch 18 may be set to produce a high output signal when the room temperature is 72° F. or less and a low output signal otherwise. The temperature sensitive switches 16 and 18 may be disposed, either separately or together, at any suitable location where an accurate indication of room temperature is provided. Preferably, they are collectively disposed inside the regulated unit in the vicinity of the return air intake.

As shown, the output signals from the switches 16 and 18 are applied as separate inputs to the logic circuitry 20. The logic circuitry 20 also receives a third input signal from the cycler circuit 22. When the cycler circuit 22 is activated, the output signal from the cycler 22 is continuous and has a preset duty cycle determined by the timing module 24. For reasons that will be apparent hereinafter, the cycler circuit 22 receives an input signal from the starting circuit 26 which, in turn, receives an input signal from the switch 16. As shown, the input to the logic circuit 20 from the switch 18 is also tied to the output of the short cycle protection circuit 28. As will be apparent hereinafter, the short cycle protection circuit 28 prevents the compressor 12 from short cycling.

The logic circuit 20 generates either a high or low output signal depending on the state of its various input signals. This will be explained in greater detail hereinafter. As shown, the output signal from the circuit 20 is connected to the input of an amplifier 30, the output of which is connected to one contact 31 of a three position switch 36. The wiper arm 38 of the switch 36 is connected to the coil of an isolation relay 40. One contact of the relay 40 is connected to a DC source V+ and the other contact is connected to the coil of a power relay 42. The contacts of the power relay 42 are connected, respectively, to the AC power source available in the regulated unit and to one side of the unit's cooling thermostat 44. The other side of the thermostat 44 is, as usual, connected to the compressor 12.

It will be apparent that whenever the switch 36 is in the AUTO position 31 and the output from the logic circuit 20 is high, the relays 40 and 42 will close and AC power will be applied to the thermostat 44. This corresponds to conventional operation of the regulated unit wherein the occupant controls activation and deactivation of the compressor 12 by adjusting the thermostat 44. However, when the switch 36 is in the AUTO position and the signal at the output of the logic circuit 20 is low, the relays 40 and 42 will open, thereby interrupting the supply of AC power to the thermostat 44. In this situation, the compressor 12 will remain deactivated regardless of the setting on the thermostat 44.

As noted, the output signal from the logic circuit 20 is either high or low, depending on the state of the various input signals. Specifically, whenever the room temperature is below the low end of the comfort zone as set by the switch 18, i.e. below 72° F., the high input signal to the logic circuit 20 received from the switch 18 will send the output signal from the circuit 20 to its low state, regardless of the state of the other input signals to the circuit 20. As above described, when the output signal from the circuit 20 is low, the compressor will be deactivated regardless of the setting on the thermostat 44. Thus, whenever the room temperature is below 72° F., the cooling mode of the controller 10 will override the thermostat 44 thereby insuring that the occupant cannot call for a lower temperature. This is the first priority of the controller 10, i.e. to insure that the compressor 12 is deactivated whenever the room temperature is below the low temperature limit as set by the switch 18.

In the event the input signal from the switch 18 is low, the logic circuitry 20 will next respond to the input signal from the switch 16. When the input signal from the switch 16 is high, thereby indicating that the room temperature exceeds the upper end of the comfort zone, i.e. is above 78° F., the output signal from the circuit 20 will go high. This in turn will close the relays 40 and 42 thereby connecting the thermostat 44 to AC power. When this occurs, the thermostat 44 will function in the usual fashion and will deactivate the compressor 12 if the thermostat setting is higher than the room temperature annd activate the compressor if the thermostat setting is lower than the room temperature.

In the event the output signals from both the switches 16 and 18 are low, thereby indicating that the room temperature is in the comfort zone between 72° F. and 78° F., the logic circuit 20 will then respond to its lowest priority input, the input signal from the cycler circuit 22. As noted, the output signal from the cycler circuit 22 has a fixed duty cycle set by the timing module 24. For example, the output signal from the circuit 22 may be set for a 20% off duty cycle over a fifteen minute period. In such event, the output signal from the circuit 22 will be high for twelve minutes and low for three minutes during each fifteen minute interval. Whenever the output signal from the circuit 22 is high, the output signal from the circuit 20 will also go high. As described, this will close the relays 40 and 42 and connect the thermostat 44 to AC power. The thermostat 44 will then regulate the compressor 12 in the normal fashion. When the output signal from the circuit 22 is low, the output signal from the circuit 20 will also go low. This will open the relays 40 and 42 thereby disconnecting the thermostat 44 from AC power and deactivating the compressor 12.

It will therefore be apparent that the cooling section of the controller 10 permits continuous operation of the compressor 12 when the room temperature is above the upper limit of the comfort zone, deactivates the compressor 12 whenever the room temperature is below the lower limit of the comfort zone, and cycles the compressor 12 whenever the room temperature is between the upper and lower limits of the comfort zone. However, and as is apparent from the series arrangement of power relay 42 and thermostat 44, under no circumstances does the controller 10 activate the compressor 12 when the thermostat setting selected by the room occupant would otherwise call for deactivation. Thus, whenever the occupant selects a temperature higher than the room temperature, that will automatically decouple the compressor 12 from the AC source regardless of the output signal from the circuit 20.

As noted, the short cycle protection circuit 28 prevents the compressor 12 from short cycling. Considering first the upper limit of the comfort zone, assume that the room temperature is initially in the comfort zone, i.e. between 72° F. and 78° F. As described hereinabove, as long as this situation prevails, the compressor 12 will be cycled according to the duty cycle of the output signal from the circuit 22. Assume now that the room temperature rises above the upper limit of the comfort zone set by the switch 16, and that this occurs just after the output signal from the cycling circuit 22 changes from high to low, and thus just after the compressor 12 has been deactivated. In the absence of the short cycle protection circuit 28, the output signal from the logic circuit 20 would then immediately go high, thereby again activating the compressor 12. The result will be that the compressor 12, initially on, would be turned off and on again in a very short period of time. To prevent this, and as diagrammatically illustrated by the line 46 in FIG. 1, the output signal from the cycling circuit 22 is connected to the input of the short cycle protection circuit 28. Whenever the output signal from the cycler 22 goes from high to low, the output signal from the short cycle protection circuit 28 goes high. As shown, the output signal from the short cycle protection circuit 28 is connected to the same input of the logic circuit 20 as the output signal from the switch 18. Since this is the highest priority input to the logic circuit 20, the output signal from the circuit 20 will go low whenever the output signal from the short cycle protection circuit 28 goes high. The output signal from the circuit 28 will remain high for a preset time period, typically three minutes. Thus, the short cycle protection circuit 28 insures three minutes of compressor off time whenever the output signal from the circuit 22 goes from high to low.

Focusing attention now on the low end of the comfort zone, some form of protection is needed to prevent the compressor 12 from short cycling when the room temperature rises above 72° F. Accordingly, and as shown in FIG. 1, the output signal from the switch 18, in addition to being applied as one of the inputs to the logic circuit 20, is also applied via the line 48 as an input to the short cycle protection circuit 28. The circuit 28 is designed such that when the output signal from the switch 18 goes from high to low, thereby indicating that the room temperature has risen above the lower limit of the comfort zone, the short cycle protection circuit 28 goes high for a fixed period which, as noted, is typically three minutes. This insures that the output signal from the logic circuit 20 will remain low for an additional three minute period after the room temperature rises above 72° F. which, in turn, guarantees three minutes of compressor off time. This also allows the temperature to rise into the middle portion of the comfort zone thus providing additional energy savings. At the end of the three minute period, the compressor 12 will begin to cycle in the manner described hereinabove. Of course, and as will be apparent to those skilled in the art, the requisite short cycle protection for compressor 12 may be implemented by numerous means other than that illustrated in FIG. 1.

As shown, the starting circuit 26 is connected to the output of the switch 16. Whenever the swich 16 goes from high to low, thereby indicating that the room temperature has dropped below the upper limit of the comfort zone, the circuit 26 is triggered to provide a suitable enable signal to the cycling circuit 22. The circuit 22 will then begin cycling at the beginning of the high portion of its duty cycle. In the example given, this will keep the compressor 12 activated for twelve minutes after the room temperature drops below the upper limit of the comfort zone. The circuit 26 also disables the cycling circuit 22 whenever the room temperature rises above the upper limit of the comfort zone. This prevents the circuit 22 from activating the short cycle protection circuit 28 and hence deactivating the compressor 12 when the room temperature is above the upper limit of the comfort zone.

Figure 2:
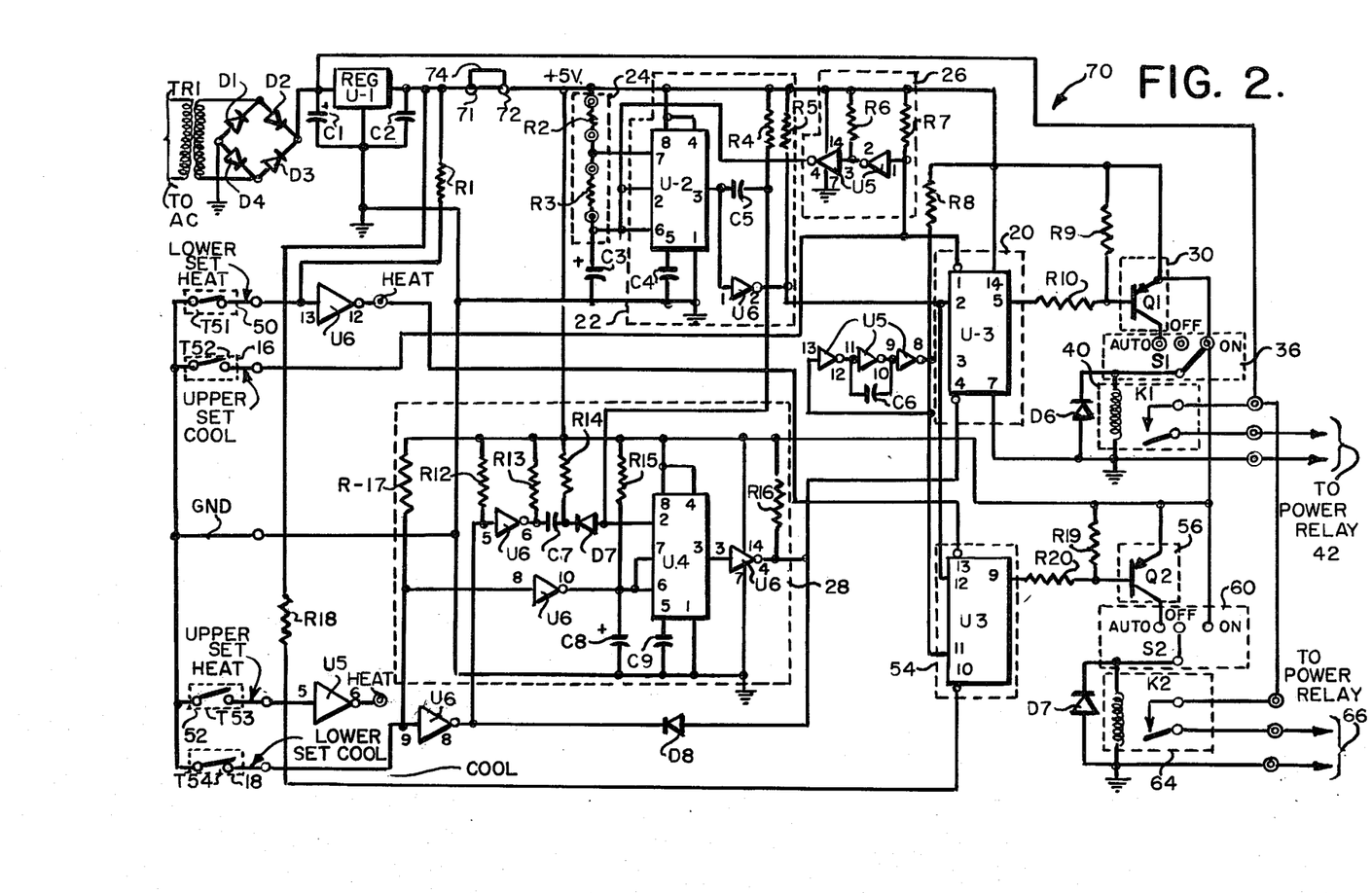
FIG. 2 is a schematic drawing illustrating the preferred analog circuit for implementing the controller of FIG. 1.

The heating section of the controller 10 is essentially the same as the cooling portion. Thus, and as shown, the heating section includes two temperature sensitive switches 50 and 52. The switch 50 provides an output signal whenever the room temperature drops below a first predetermined temperature which defines the lower limit of the heating comfort zone, and the switch 52 provides an output signal whenever the room temperature rises above a second predetermined temperature which defines the upper limit of the heating comfort zone. Typical values for the upper and lower limits of the heating comfort zone are 68° F. and 62° F., respectively. As shown, the signals from the temperature sensitive switches 50 and 52 define two of the inputs to the logic circuit 54. The logic circuit 54 also receives an input from the cycler circuit 22. The output signal from the logic circuit 54 is applied to an amplifier 56 whose output, in turn, is connected to one contact 57 of a three position switch 60. The wiper arm 62 of the switch 60 is connected to the coil of a low voltage isolation relay 64. The low voltage signal V+ across the contacts of the relay 64 is applied to the coil of power relay 66, one of whose contacts is connected to the AC power source. The other contact of the relay 66 is connected to one side of the heating thermostat 68. As shown, the other side of the thermostat 68 is connected to the resistive heating element 14. Generally, the regulated unit will include but a single thermostat and the thermostats 44 and 68 will be one and the same. Two thermostats are shown in FIGS. 1 and 2 for purposes of clarity.

Operation of the heating section of the controller 10 is similar to that of the cooling section. In describing such operation, it will again be assumed that the wiper arm 62 of the switch 60 is in the AUTO position 57. Thus, whenever the room temperature is above the upper limit of the comfort zone as set by the switch 52, the output signal from the logic circuit 54, in response to the high signal from the switch 52, will go low. This will open the relays 64 and 66 thereby disconnecting the heating element 14 from the AC power source. Under these conditions, the heating element will be deactivated regardless of the thermostat setting selected by the room occupant. This is the first priority of the logic circuit 54.

Whenever the room temperature falls below the low limit of the comfort zone as defined by the switch 50, the output signal from the switch 50 will go high. In response, the output signal of the logic circuit 54 will also go high thereby closing the relays 64 and 66. This will connect the thermostat 68 to the AC power source. Then, if the thermostat setting selected by the room occupant is higher than the actual room temperature, the heating element 14 will be activated in the usual fashion.

When the room temperature is between the upper and lower limits of the heating comfort zone, the signals from the switches 50 and 52 will both be low. In such event, the logic circuit 54 responds to the signal from the cycling circuit 22. Accordingly, the output signal from the circuit 54 will then cycle in accordance with the preset duty cycle of the circuit 22. Then, provided the thermostat setting selected by the room occupant is higher than the room temperature, the output signal from the circuit 54 will continuously activate and deactivate the heating element 14 as long as the room temperature is in the comfort zone. Of course, rather than using the cycler circuit 22 for this purpose, a separate cycler circuit having a different duty cycle may be used. Because there is no danger of damage to the heating element as a result of short cycling, no short cycle protection circuits are included in the heating section of the controller 10.

It will therefore be apparent that in the heating mode, the controller 10 operates in substantially the same fashion as it does in the cooling mode. Thus, it cycles the heating element 14 whenever the room temperature is between the upper and lower limits of the comfort zone, it activates the heating element whenever the room temperature is below the lower limit of the comfort zone, and it deactivates the heating element whenever the room temperature is above the upper limit of the comfort zone. However, and as is again apparent from the series arrangement of heating element 14 and thermostat 68, the circuit 10 never activates the heating element when the thermostat setting selected by the room occupant is lower than the room temperature.

To this point, operation of the cooling and heating modes of the controller 10 has been described with the wiper arms of the switches 36 and 60 in the AUTO position. Referring first to the cooling mode, if the wiper arm of the switch 36 is thrown to the ON position 33, the coil of the isolation relay 40 will then be connected directly to a voltage signal corresponding to a high signal from the amplifier 30. This will close the relays 40 and 42 whereupon operation of the compressor 12 will be controlled in the conventional manner by the thermostat 44. Thus, when the switch 36 is in the ON position, the incremental unit functions as if the controller 10 were not present. If the switch is now moved to the OFF position, the coil of the relay 40 will be grounded. This will open relays 40 and 42 thereby disconnecting thermostat 44 from the AC power source. In this position, activation of compressor 12 by the room occupant is not possible. This position is used, for example, during the winter months when no cooling is necessary.

Referring now to the heating mode, it will now be apparent that when the switch 60 is in the ON position 59, the relays 64 and 66 will be closed and the heating element 14 will be controlled in the usual fashion by the thermostat 68. When the switch 60 is in the OFF position 58, the relays 64 and 66 will be open and operation of the heating element 14 by the room occupant will be precluded. Again, the OFF position 58 will generally be used during the warmer months when no heating is necessary.

Referring now to FIG. 2, the preferred analog circuit 70 for implementing the controller 10 is illustrated. In FIG. 2, the circuit components corresponding to the functional blocks from FIG. 1 have been indicated. However, it will be apparent to those skilled in the art that in some instances, the inclusion of particular circuit components in one or another of the functional blocks is purely arbitrary. In addition, to simplify the circuit diagram of FIG. 2, certain passive components have not been included in any particular functional block. However, their purpose will be readily apparent to the skilled art worker. Those skilled in the art will also appreciate that the terms "high" and "low" as used in connection with the block diagram of FIG. 1 have no special significance in FIG. 2. That is, what has been termed a high output in connection with FIG. 1 may correspond to either a 5 VDC signal or a 0 VDC signal in FIG. 2. Accordingly, it should be recognized that the terms "high" and "low" have simply been used to indicate the two possible output states of the various functional blocks in FIG. 1.

The following table indicates appropriate circuit components for incorporation in the circuit 70 illustrated in FIG. 2:

| Circuit Designation | Component |
|---|---|
| R1, R4, R5, R6, R7, R8, R9, R12, R13, R14, R16, R17, R18, R19 | 10 Kohm, ¼, 5% |
| R2, R3 | 2.7 Mohm and 1 Mohm, respectively, for 30% off duty cycle. Both ¼W, 5% |
| R10, R20 | 270 Ohm, ¼, 5% |
| R15 | 1 Mohm, ¼W, 5% |
| C1 | 1000 μF @ 16V |
| C2, C5 | .1 μF @ 6V min. |
| C3 | ITT Tap-F-220-K 6.3, 220 @ 6V ± 10% |
| C4, C6, C9 | .01 μF @ 6V min. |
| C7 | ITT Tap-F-1.0-K-35, 1 μF 6V |
| C8 | ITT Tap-F-100-K-6.3, 100 μF @ 6V |
| D1, D2, D3, D4 | IN 4004 |
| D6, D7, D8, D9 | IN 4148 |
| U1 | National LM 340T-5 |
| U2, U4 | National LM 555Cn |
| U3 | National DM 7474N |
| U5, U6 | National DM 7405N |
| S1, S2 | One pole, three position |
| K1, K2 | EAC 1H5AH |
| TR1 | 115/230 10V@.6 amp |
| TS1, TS2, TS3, TS4 | Accustat-Variable |
| Q1, Q2 | National 2N4126 |
| Power Relays 42, 66 | Arrowmat JA1ATMDC6V |

Depending on the particular application, certain parameters of the circuit 70 illustrated in FIG. 2 may be varied. For example, the response temperatures of the temperature sensitive switches 16, 18, 50 and 52 may be preselected for any desired values. Also, the duty cycle of the cycling circuit 22 may be adjusted by proper selection of the resistors R2 and R3. For this reason, the resistors R2 and R3 are preferably collectively disposed in a plug-in type module. Likewise, the time period of the short cycle protection circuit 28 may be varied by changing the value of the resistor R15. However, this is generally not done as a three minute period is acceptable in most applications.

In some instances, the capacity for controlling both heating and cooling will not be required. In such instance, those skilled in the art will appreciate that certain of the components illustrated in FIGS. 1 and 2 may be eliminated. For example, if only cooling control is required, all of the components illustrated in the lower half of FIG. 1 may be dispensed with.

As noted, the analog circuit 70 illustrated in FIG. 2 is exemplary, and numerous other circuits suitable for implementing the preferred controller 10 may be devised by those skilled in the art. Also, various options may be added to the circuit illustrated in FIG. 2. For example, a room occupant detection circuit may be added. Thus, upon leaving the room, patrons of hotels and motels often set the thermostat to provide maximum cooling (heating) so that the room will be cold (hot) when they return. To avoid this waste of energy, the circuit 80 illustrated in FIG. 3 may be used. The circuit 80 is connected into the circuit 70 illustrated in FIG. 2 by connecting the leads 82 and 84 to the pins 71 and 72 and removing the jumper wire 74.

Figure 3:
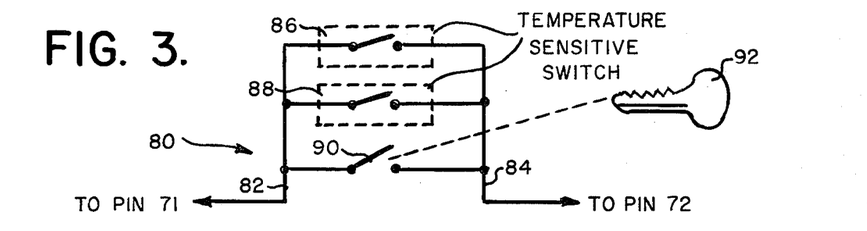
FIG. 3 is a schematic drawing of an occupant detection circuit which may be included in the controller of the present invention.

As shown, the circuit 80 includes two additional temperature sensitive switches 86 and 88 and a third, preferably manually operable switch 90. The switch 90 may, for example, be operable by the room key 92 in which case a box having an opening for the key 92 may be provided on or adjacent the incremental unit. Upon placing the key 92 in the box and turning it, the switch 90 would be closed. This would provide a short circuit between the pins 71 and 72 thereby allowing the circuit 70 to function in the usual fashion. Upon leaving the room, the occupant would then remove the key 92 which would open the switch 90 thereby creating an open circuit between the pins 71 and 72. Since the pin 71 is connected directly to the regulated voltage supply for the circuit 70, the open circuit condition between the pins 71 and 72 will interrupt the power supply to the circuit. This will open the power relays 42 and 66 thereby precluding activation of either the compressor 12 or heating element 14.

The temperature sensitive switch 86 is included to prevent the room from getting too hot during the warmer months. For example, the temperature sensitive switch may be selected to close at some temperature higher than the upper limit of the cooling comfort zone set by the switch 16. Accordingly, if the switch 90 is open and the room temperature rises above the temperature at which the switch 86 responds, the switch 86 will close thereby creating a short circuit condition between the pins 71 and 72. At that point, the compressor 12 will be activated until the room temperature is driven below the response temperature of switch 86, whereupon the switch 86 will again open. Likewise, during the colder months, the temperature sensitive switch 88 prevents the room from getting too cold. Accordingly, the switch 88 is selected to close at some predetermined temperature below the low end of the heating comfort zone as defined by the temperature sensitive switch 50.

Of course, means other than the key 92 may be used for opening and closing the switch 90. For example, the switch 90 could be operated by a signal from a circuit which counts the number of people entering and leaving the room and opens the switch 90 when the counter indicates that the room is empty.

The circuit 70 of FIG. 2 may also be designed to provide fail safe operation in the AUTO mode. This is easily done by designing the circuit such that the contacts of the power relays 42 and 66 close in response to an open contact condition in the relays 40 and 64, respectively. Therefore, in the event the relays 40 and 64 are open as a result as a malfunction in the circuit 70, the contacts of the power relays 42 and 66 will close and the compressor 12 and heating element 14 will be operable in the usual manner by the thermostats 44 and 68, respectively.

Figure 4:
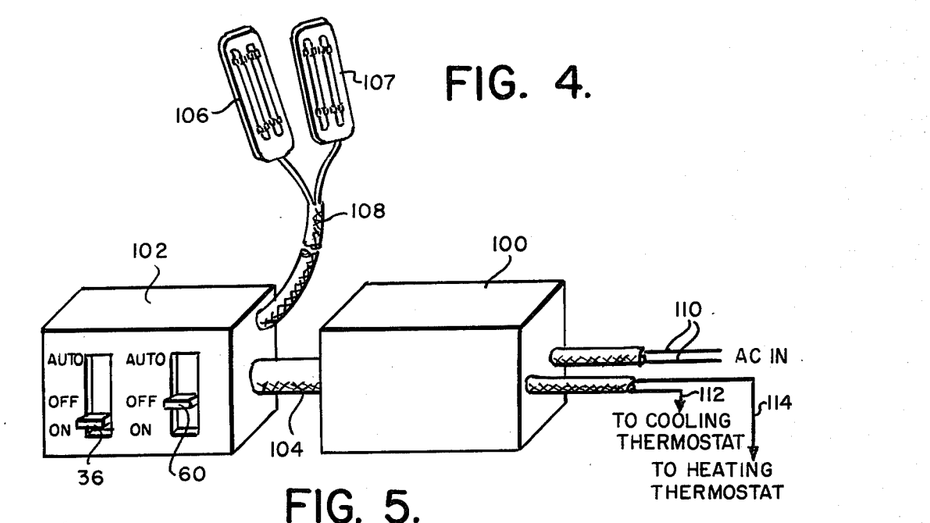
FIG. 4 is a perspective drawing illustrating the preferred packaging for the controller of the present invention.

The preferred packaging for the controller 10 illustrated in FIGS. 1 and 2 is shown in FIG. 4. For safety reasons, the components are preferably packaged in two separate boxes 100 and 102. The box 100 contains all the high power components and thus includes the transformer T1 and the power relays 42 and 66. All the other components of the circuit illustrated in FIG. 2, except for the temperature sensitive switches 16, 18, 50 and 52, are housed in the box 102. As shown, a multiple wire cable 104 is provided for connecting the output windings of the transformer T1 in the box 100 to the diode bridge in the box 102, and for connecting the contacts of the isolation relays 40 and 64 in the box 102 to the coils of the power relays 42 and 66 in the box 100. The temperature sensitive switches 16 and 18 are preferably collectively disposed on a probe unit 106 which is connected to the circuit components in the box 102 by the cable 108. Likewise, the temperature sensitive switches 50 and 52 are preferably disposed on a probe unit 107 which is also connected to the box 102 by the cable 108. This permits separation of the cooling and heating sensors when separate air intakes for the cooling and heating sections of the regulated unit are provided.

Figure 5:
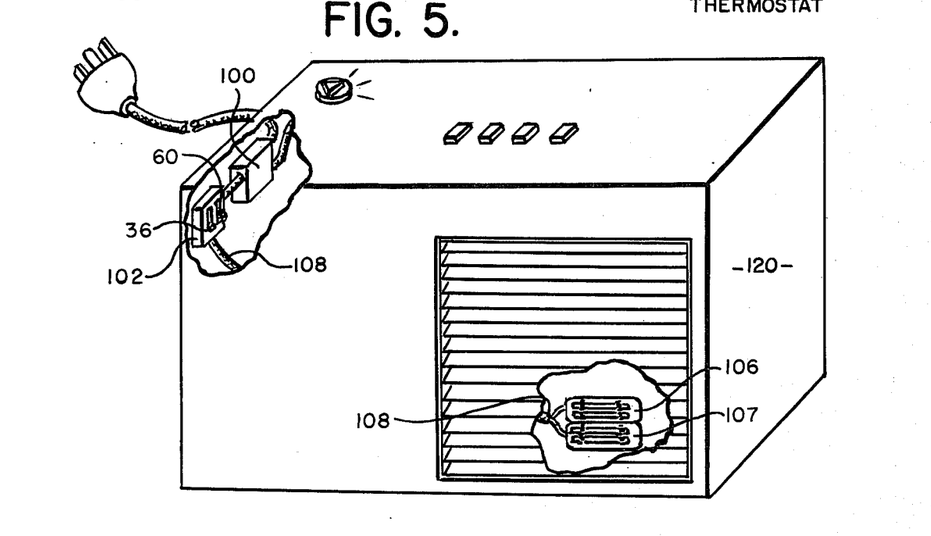
FIG. 5 is a perspective drawing illustrating the controller of the present invention as installed.

A significant advantage of the controller of the present invention is that it is easily retrofitted into existing incremental or window units. To do so, the cover of the unit to be retrofitted is first removed. The boxes 100 and 102 are then secured to an inside wall of the unit as by screws extending through screw holes in the receptacles provided for this purpose. The thermostat may then be disconnected from the AC power and reconnected to the contacts of the power relays 42 and 66 via the wires 112 and 114. The wires 110 are then connected to the AC power available in the unit. The probes 106 and 107 may then be secured at the air intake to the unit, again as by screws. In FIG. 5, it is assumed that a single air intake serves both the heating and cooling sections of the regulated unit. Installation is completed by replacing the cover on the incremental unit. The controller 10 of the present invention as installed in an incremental unit 120 is illustrated in FIG. 5.

As noted, the controller 10 and circuit 70 illustrated in FIGS. 1 and 2, respectively, represent the presently preferred embodiment of the present invention. However, and as described above, the present invention may be practiced by employing numerous other circuits. Accordingly, the above description should be construed as illustrative and not in the limiting sense, the scope of the invention being defined by the following claims:

We claim:

1. A controller for a system of the type which regulates the temperature in a space, said system including a first energy consuming component and an energy source for activating said component when said energy source is connected thereto, said controller comprising:
   a first preset temperature sensitive device for providing a first output signal at a first predetermined temperature;
   a second preset temperature sensitive device for providing a second output signal at a second predetermined temperature, said second predetermined temperature being lower than said first predetermined temperature;
   means for generating a third output signal having a first predetermined duty cycle;
   first switch means operatively connected to said energy source and said first energy consuming component, said switch means being operable in a first mode wherein said switch means interrupts the connection between said energy source and said first component, and a second mode wherein the connection between said energy source and said first component is uninterrupted by said switch means; and
   first control means operatively connected to said first, second and third output signals, and said first switch means, for
   (a) operating said switch means in one of said first and second modes when said first output signal is present at said control means,
   (b) cycling said switch means between said first and second modes according to said first predetermined duty cycle when neither of said first and second output signals is present at said control means, and
   (c) operating said switch means in the other of said first and second modes when said second output signal is present at said control means.

2. The controller according to claim 1, wherein said system is of the type which cools the temperature in said space, and wherein said one mode is said second mode and said other mode is said first mode.

3. The controller according to claim 2, wherein said first component is a compressor.

4. The controller according to claim 3, wherein said first control means further comprises short cycle protection means for holding said switch means in said first mode for a minimum predetermined time.

5. The controller according to claim 3, wherein said system further comprises thermostatic switch means operatively connected to said energy source and said compressor and responsive to a preset variable temperature, said thermostatic switch means being operable in a first mode wherein said thermostatic switch means interrupts the connection between said energy source and said compressor when said space temperature is less than said preset variable temperature, and a second mode wherein the connection between said energy source and said compressor is uninterrupted by said thermostatic switch means when said space temperature exceeds said preset variable temperature.

6. The controller according to claim 5, wherein said first switch means and said thermostatic switch means are connected in series with said energy source and said compressor.

7. The controller according to claim 2, further comprising occupant detection means for operating said first switch means in said first mode when said space is unoccupied.

8. The controller according to claim 7, wherein said occupant detection means further comprises means for operating said switch means in said second mode when said space is unoccupied and said space temperature exceeds an other predetermined temperature in excess of said first predetermined temperature.

9. The controller according to claim 1, wherein said system is of the type which heats the temperature in said space, and wherein said one mode is said first mode and said other mode is said second mode.

10. The controller according to claim 9, wherein said first component is a heating coil.

11. The controller according to claim 9, wherein said system further comprises thermostatic switch means operatively connected to said energy source and said component and responsive to a preset variable temperature, said thermostatic switch means being operable in a first mode wherein said thermostatic switch means interrupts the connection between said energy source and said component when said space temperature exceeds said preset variable temperature and a second mode wherein the connection between said energy source and said component is uninterrupted by said thermostatic switch means when said space temperature is less than said preset variable temperature.

12. The controller according to claim 11, wherein said first switch means and said thermostatic switch means are connected in series with said energy source and said component.

13. The controller according to claim 9, further comprising occupant detection means for operating said first switch means in said first mode when said space is unoccupied.

14. The controller according to claim 13, wherein said occupant detection means further comprises means for operating said first switch means in said second mode when said space is unoccupied and said space temperature is less than an other predetermined temperature, said other predetermined temperature being lower than said second predetermined temperature.

15. The controller according to claim 2, wherein said system further comprises means for heating the temperature in said space, said heating means including a second energy consuming component, said second component being activated by said energy source when said energy source is connected thereto, and wherein said control means further comprises means for generating a fourth output signal indicative of a third predetermined temperature;
means for generating a fifth output signal indicative of a fourth predetermined temperature, said fourth predetermined temperature being lower than said third predetermined temperature;
means for generating a sixth output signal having a second predetermined duty cycle;
second switch means operatively connected to said energy source and said second component, said second switch means being operable in a first mode wherein said second switch means interrupts the connection between said energy source and said second component and a second mode wherein the connection between said energy source and said second component is uninterrupted by said second switch means; and second control means operatively connected to said fourth, fifth and sixth output signals, and said second switch means, for
(a) operating said second switch means in said first mode when said space temperature exceeds said third predetermined temperature,
(b) cycling said second switch means between said first and second modes according to said second predetermined duty cycle when said space temperature is between said third and fourth predetermined temperatures, and
(c) operating said second switch means in said second mode when said space temperature is less than said fourth predetermined temperature.

16. The controller according to claim 15, wherein said second predetermined duty cycle is equal to said first predetermined duty cycle, and wherein said means for generating said sixth output signal is said means for generating said third output signal.

17. The controller according to claim 16, wherein said first component is a compressor.

18. The controller according to claim 17, wherein said first control means further comprises short cycle protection means for holding said switch means in said first mode for a minimum predetermined time period.

19. The controller according to claim 18, wherein said second component is a heating coil.

20. The controller according to claim 15, wherein said system further comprises first thermostatic switch means operatively connected to said energy source and said first component and responsive to a first preset variable temperature, said first thermostatic switch means being operable in a first mode wherein said thermostatic switch means interrupts the connection between said energy source and said first component when said space temperature is less than said first preset variable temperature, and a second mode wherein the connection between said energy source and said first component is uninterrupted by said thermostatic switch means when said space temperature is greater than said first preset variable temperature.

21. The controller according to claim 20, wherein said system further comprises second thermostatic switch means operatively connected to said energy source and said second component and responsive to a second preset variable temperature, said second thermostatic switch means being operable in a first mode wherein said thermostatic switch means interrupts the connection between said energy source and said second component when said space temperature is greater than said second preset variable temperature, and a second mode wherein the connection between said energy source and said second component is uninterrupted by said second thermostatic switch means when said space temperature is less than said second preset variable temperature.

22. The controller according to claim 21, wherein said second thermostatic switch means is said first thermostatic switch means.

23. The controller according to claim 15, and further comprising occupant detection means for operating said first and second switch means in their respective first modes when said space is unoccupied.

24. The controller according to claim 23, wherein said occupant detection means further comprises means for operating said first switch means in said second mode when said space is unoccupied and said space temperature exceeds a fifth predetermined temperature in excess of said first predetermined temperature, and means for operating said second switch means in said second mode when said space is unoccupied and said space temperature is less than a sixth predetermined temperature which is less than said fourth predetermined temperature.

25. The controller according to claim 1, wherein said predetermined duty cycle is less than a 50% duty cycle, and wherein during said switch means cycling said control means operates said switch means in said first mode for said less than 50% of said duty cycle and operates said switch means in said second mode for the remainder of said duty cycle.

26. The controller according to claim 2, wherein said less than 50% of said duty cycle is 20% of said duty cycle.

27. A controller for a system of the type capable of both heating and cooling the temperature in a space, said system including first and second energy consuming components for cooling and heating said space, respectively, and an energy source for activating said components when said energy source is connected thereto, said controller comprising:

means for generating a first output signal indicative of a first predetermined temperature;

means for generating a second output signal indicative of a second predetermined temperature, said second predetermined temperature being lower than said first predetermined temperature;

means for generating a third output signal having a first predetermined duty cycle;

first switch means operatively connected to said energy source and said first energy consuming component, said switch means being operable in a first mode wherein said switch means interrupts the connection between said energy source and said first component, and a second mode wherein the connection between said energy source and said first component is uninterrupted by said switch means;

first control means operatively connected to said first, second and third output signals, and said first switch means, for (a) operating said switch means in said second mode when said space temperature exceeds said first predetermined temperature, (b) cycling said switch means between said first and second modes according to said first predetermined duty cycle when said space temperature is between said first and second predetermined temperatures, and (c) operating said switch means in said first mode when said space temperature is less than said second predetermined temperature, means for generating a fourth output signal indicative of a third predetermined temperature;

means for generating a fifth output signal indicative of a fourth predetermined temperature, said fourth predetermined temperature being lower than said third predetermined temperature;

means for generating a sixth output signal having a second predetermined duty cycle;

second switch means operatively connected to said energy source and said second energy consuming component, said second switch means being operable in a first mode wherein said second switch means interrupts the connection between said energy source and said second component and a second mode wherein the connection between said energy source and said second component is uninterrupted by said second switch means; and second control means operatively connected to said fourth, fifth and sixth output signals, and said second switch means, for (a) operating said second switch means in said first mode when said space temperature exceeds said third predetermined temperature, (b) cycling said second switch means between said first and second modes according to said second predetermined duty cycle when said space temperature is between said third and fourth predetermined temperatures; and (c) operating said second switch means in said second mode when said space temperature is less than said fourth predetermined temperature.

28. The controller according to claim 27, wherein said second predetermined duty cycle is equal to said first predetermined duty cycle, and wherein said means for generating said sixth output signal is said means for generating said third output signal.

29. The controller according to claim 28, wherein said first component is a compressor.

30. The controller according to claim 29, wherein said first control means further comprises short cycle protection means for holding said switch means in said first mode for a minimum predetermined time period.

31. The controller according to claim 30, wherein said second component is a heating coil.

32. The controller according to claim 27, wherein said system further comprises first thermostatic switch means operatively connected to said energy source and said first component and responsive to a first preset variable temperature, said first thermostatic switch means being operable in a first mode wherein said thermostatic switch means interrupts the connection between said energy source and said first component when said space temperature is less than said first preset variable temperature, and a second mode wherein the connection between said energy source and said first component is uninterrupted by said thermostatic switch means when said space temperature is greater than said first preset variable temperature.

33. The controller according to claim 32, wherein said system further comprises second thermostatic switch means operatively connected to said energy source and said second component and responsive to a second preset variable temperature, said second thermostatic switch means being operable in a first mode wherein said thermostatic switch means interrupts the connection between said energy source and said second component when said space temperature is greater than said second preset variable temperature, and a second mode wherein the connection between said energy source and said second component is uninterrupted by said second thermostatic switch means when said space temperature is less than said second preset variable temperature.

34. The controller according to claim 33, wherein said second thermostatic switch means is said first thermostatic switch means.

35. The controller according to claim 27, and further comprising occupant detection means for operating said first and second switch means in their respective first modes when said space is unoccupied.

36. The controller according to claim 35, wherein said occupant detection means further comprises means for operating said first switch means in said second mode when said space is unoccupied and said space temperature exceeds a fifth predetermined temperature in excess of said first predetermined temperature, and means for operating said second switch means in said second mode when said space is unoccupied and said space temperature is less than a sixth predetermined temperature which is less than said fourth predetermined temperature.

* * * * *